Sept. 5, 1944.　　　　A. W. BAIRD　　　　2,357,376
ELECTRIC FILLET WELDING APPARATUS
Filed Sept. 17, 1943　　　3 Sheets-Sheet 2

INVENTOR
ALBERT W. BAIRD
BY
*E. Greenewald*
ATTORNEY

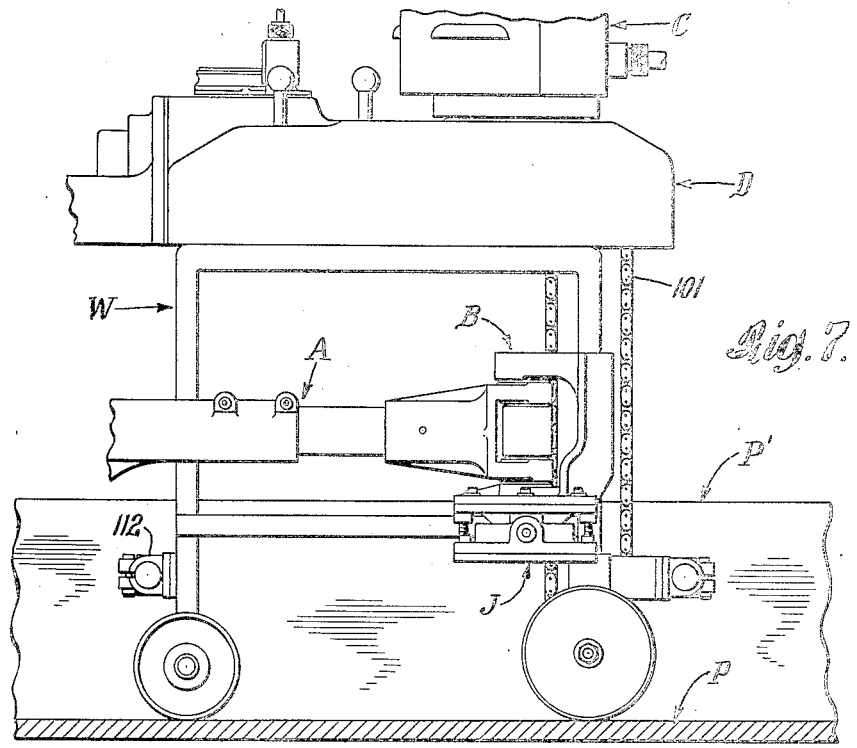
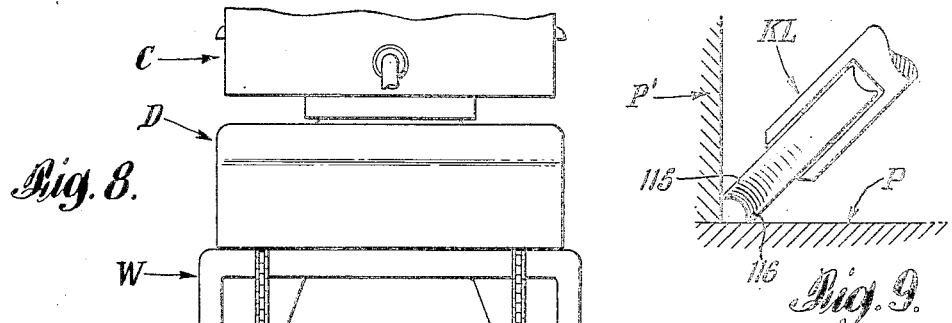
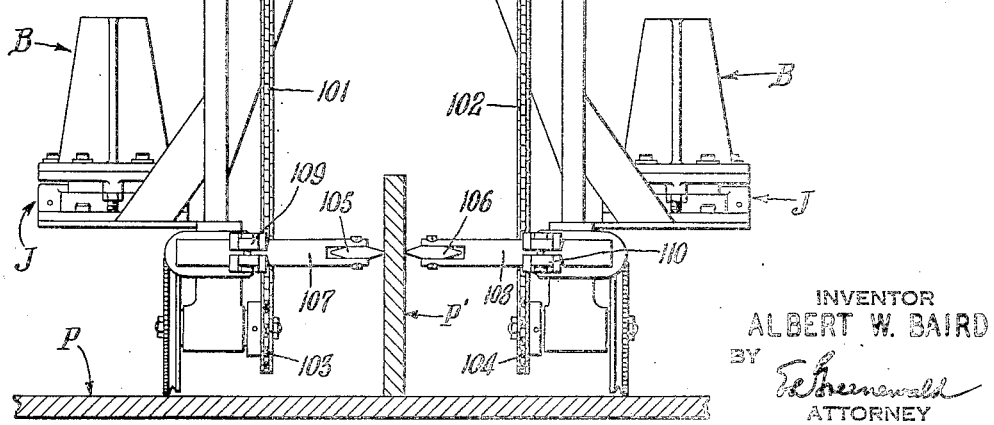

Patented Sept. 5, 1944

2,357,376

UNITED STATES PATENT OFFICE 2,357,376

ELECTRIC FILLET WELDING APPARATUS

Albert W. Baird, Cranford, N. J., assignor to The Linde Air Products Company, a corporation of Ohio Application September 17, 1943, Serial No. 502,749

20 Claims. (Cl. 219—8)

This invention pertains to electric welding apparatus and more particularly to an improved automatic welding head especially suited to the formation of fillet welds between angularly disposed metal members. This application is in part a continuation of my application Ser. No. 470,235, filed December 26, 1942.

In fillet welding with automatic electric welding apparatus, difficulty has been encountered heretofore in maintaining a desired position of the welding rod in relation to the fillet, due to waves or surface irregularities in the horizontal member on which the guiding means for the welding apparatus rides and to the customary presence of temporary tack welds which may interfere with the guiding means. Additionally, automatic electric welding apparatus at present in use is often of such bulk that it is difficult to position the apparatus properly for feeding the welding rod to the fillet at the desired angle while maintaining proper electrical clearance between the welding apparatus and the work to be welded.

It is among the objects of this invention to provide an improved automatic electric fillet welding apparatus; to provide such an apparatus in which the end of the welding rod is maintained in a desired position with respect to the fillet to be welded irrespective of surface irregularities in the member upon which the welding apparatus rides or of temporary tack welds encountered by guiding means for the apparatus; to provide such a welding apparatus including cooperating means for guiding the welding rod along the fillet to be welded and for maintaining the desired relation between the welding rod and both of the members to be welded; to provide such an apparatus including means for delivering a quantity of granular fusible welding material to the fillet to be welded; to provide such an apparatus comprising adjustably connected component elements for feeding the welding electrode at the proper angle toward the work; and to provide means readily attachable to existing welding apparatus to adapt the same for making fillet welds.

A further object of the invention is to provide an automatic apparatus for making fillet welds simultaneously on both sides of a web which is thereby secured to a base plate.

These and other objects of the invention are achieved in a manner which will become apparent from the following description and accompanying drawings, in which:

Fig. 7 is a side elevation of a part of an apparatus embodying modifications of the apparatus illustrated in Figs. 1 to 6;

Fig. 8 is an end elevation of the part of the apparatus illustrated in Fig. 7, and Fig. 9 illustrates a modified form of the guiding means for the welding apparatus.

Figure 1:
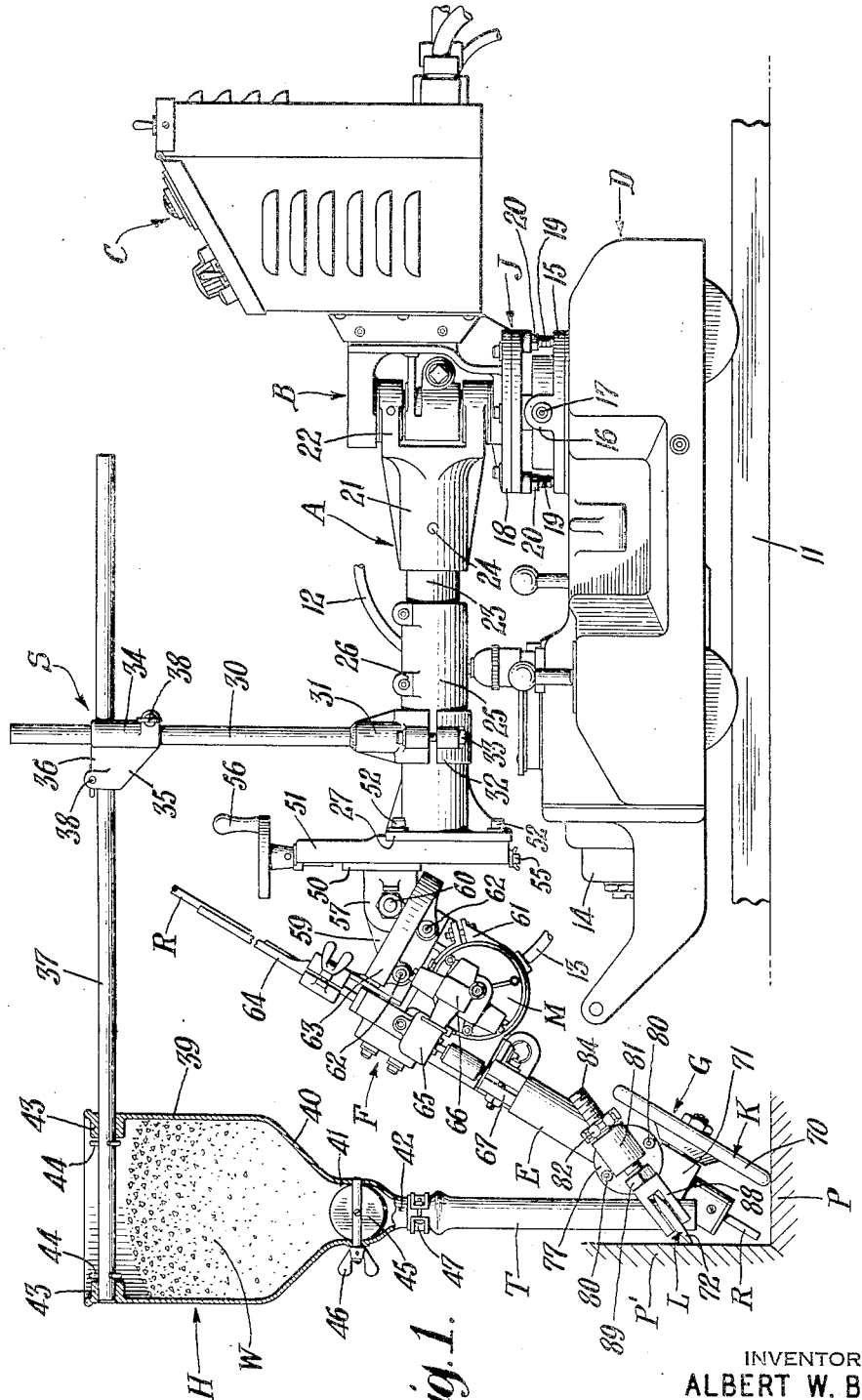
Fig. 1 is a side elevation view of welding apparatus embodying the principles of the invention, part of the apparatus being rotated through 90° into the plane of the sheet of drawing in order to illustrate the apparatus as arranged to make a fillet weld between angularly related metal members.
Figure 2:
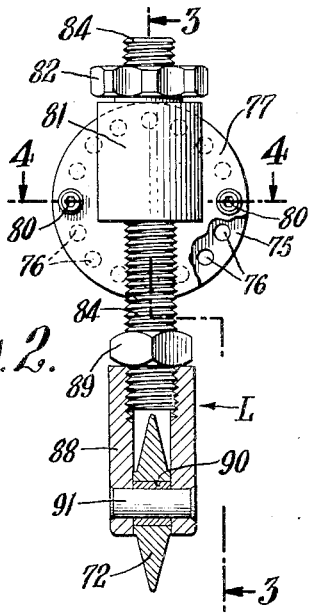
Fig. 2 is an elevation view, partly in section, of an element forming part of the guiding means for the welding apparatus.
Figure 3:
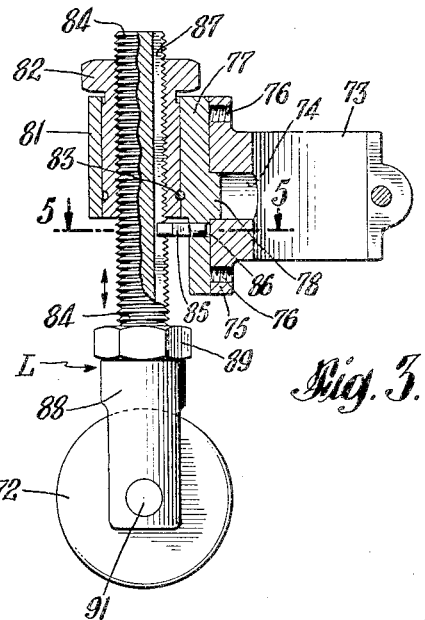
Fig. 3 is a vertical sectional view on the line 3—3 of Fig. 2, looking in the diretcion of the arrows.
Figure 4:
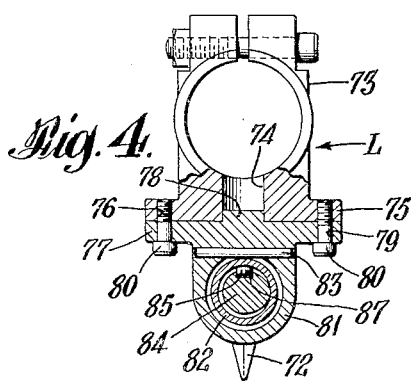
Fig. 4 is a view, partly in section, on the line 4—4 of Fig. 2, looking in the direction of the arrows.
Figure 5:
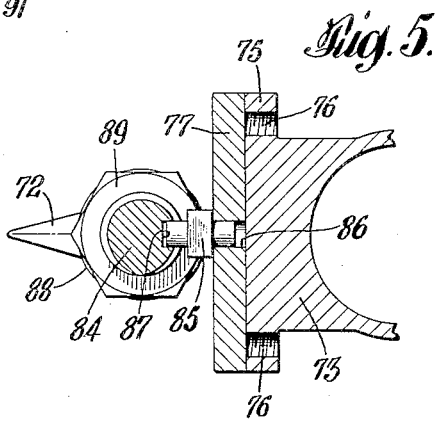
Fig. 5 is a sectional view taken on the line 5—5 of Fig. 3, looking in the direction of the arrows.
Figure 6:
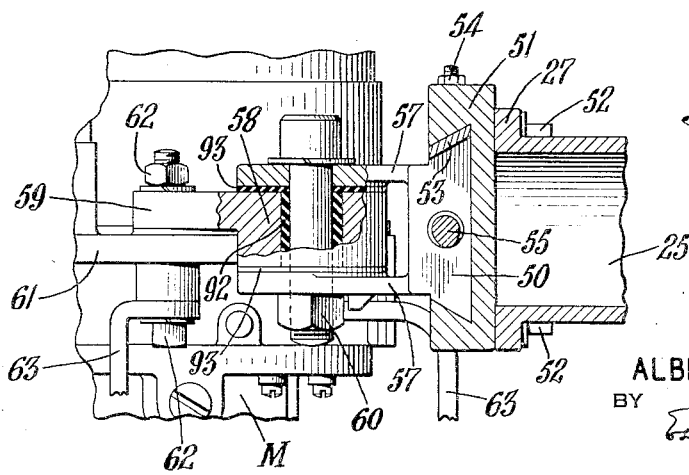
Fig. 6 is a plan view, partly in section, of means for adjusting the relation of the welding apparatus to the work to be welded.

A welding apparatus embodying this invention is particularly adaptable to the welding process described and claimed in United States Patent No. 2,043,960, issued on June 9, 1936, to Lloyd T. Jones et al. In the process described and claimed in the Jones et al. patent, welding is accomplished by passing a high amperage electric current from an electrode to the work to be welded through an inorganic welding material of high electrical resistance when cold and substantially free from substances evolving deleterious amounts of gases when heated to an elevated welding temperature; which material is heaped on the line to be welded in such quantity as to completely submerge the welding operation under a blanket or layer of the welding material.

Generally speaking, the improved electric fillet welding apparatus of the invention comprises a welding rod feeding mechanism, a welding material discharge device and a control mechanism, all mounted as a unit on a suitable moving mechanism or motive device by means of which the apparatus may be moved along a seam or line to be welded. The resultant unit is pivotally mounted on the motive device so that it may oscillate as a unit in a vertical plane relative to the motive device. Preferably, adjustable means are provided to limit the amount of oscillation of the unit relative to the motive device.

An important feature of the invention is the means for guiding the welding apparatus along the line to be welded and maintaining the welding rod directed toward the intersection of the angularly related members to be fillet welded. This means comprises an elongated bus bar extension secured to the welding rod feeding mechanism and elements, such as a pair of runners or rotatable means, for instance wheels, adjustably mounted on the extension. The bus bar extension is directed toward the intersection of the members to be welded and one guiding element is adjustably mounted thereon, travels in a plane parallel to the plane of the extension and moves along and in contact with the relatively horizontal member to be welded. The other guiding element, which may likewise be adjustably mounted on the bus bar extension, engages the relatively vertical member to be welded. Means are provided whereby the plane of travel of the latter guiding element may be adjusted angularly relative to that of the guiding element engaging the horizontal member to be welded, to adjust the horizontal spacing of the bus bar extension from the vertical plate or work member. The guiding element engaging the horizontal plate or work member is "toed in" toward the vertical plate to maintain the other guiding element in firm engagement with the vertical work member. The described arrangement maintains the bus bar extension, and hence the welding rod or electrode, constantly directed at a fixed angle to the work members.

Referring more particularly to Figs. 1 to 6 of the drawings, a welding rod feeding mechanism F, a welding material container or hopper H, and a control box C containing apparatus controlling the feeding rate of a welding rod or electrode R are mounted on a suitable moving mechanism or motive device D, whereby the several elements may be traversed as a unit along a seam to be welded. The rod feeding mechanism F and the hopper H are supported by an adjustable support A pivotally secured to a bracket B for swinging movement in a horizontal plane, and the bracket B is mounted in device D by a pivotal connection, such as a rocker hinge J. The control box C preferably is mounted on the bracket B in a position to counterbalance at least part of the weight of the feeding mechanism F and the hopper H. Through the medium of rocker hinge J, the feeding mechanism F and the hopper H may oscillate in a vertical plane with respect to device D in response to undulations of the guiding means for the apparatus as the latter encounters irregularities or waves in the work.

Hopper H is mounted on an adjustable support A through the medium of an adjustable support S in such a position that a tube T will discharge material from hopper H along the intersection of a pair of Plates P, P' to be weld united by a fillet weld. The distance of the discharge end of tube T from the work may be adjusted to control the depth of welding material deposited on the work.

The apparatus is guided along the intersection of plates P, P' by the guiding means G, which together with the plates P, P', has been turned 90° into the plane of the sheet of drawing, as illustrated in Fig. 1, in order better to illustrate the operation of the invention. The guiding means includes an elongated bus bar extension E, which is secured to the rod feeding mechanism F and directed toward the intersection of plates P, P', and the guiding elements K and L which engage the plates P, P' and are adjustably mounted on the extension E. The guiding element K travels or rotates in a plane parallel to the extension E and rides on plate P, being retained in firm contact therewith by the weight of the feeding mechanism F and hopper H which tend to pivot forwardly as a unit about the rocker hinge J. The guiding element L engages plate P' and is so adjustably mounted that its plane of travel along plate P' may be set at any one of a number of predetermined angles with respect to the plane of travel of the guiding element K. The latter is "toed in" toward the plate P' thus maintaining the guiding element L in firm engagement with plate P'. As will be more clearly apparent as the description proceeds, the described arrangement maintains the extension E in fixed relation to the work to be welded.

The motive device D may be of the type used to support cutting torches in machine cutting operations, and may either ride on the plate P or on a suitable track 11. The starting and stopping of the device D may be controlled from control box C through a suitable control cable 12. The control box C also includes controls for the welding current and automatic means, such as electronic devices, for controlling the feeding rate of electrode R in accordance with variations in the welding voltage. For this latter purpose, a motor M forming part of the feeding mechanism F receives its energizing current through a cable 13 which is connected to the control box C. To simplify the drawings, the connections of cables 12 and 13 to box C have been omitted. Additionally, the motive device D may be provided with a suitable speed governor 14 for controlling the rate of movement of the apparatus along the line to be welded.

The rocker hinge J, which is mounted on the upper surface of the device D, is generally similar to that described and claimed in my Patent 2,314,917, issued March 30, 1943, and comprises an annular ring 15 secured by studs or bolts to the upper surface of the device D and formed with upstanding apertured ears 16 in which is mounted a shaft or pintle 17 held against rotation by set screws. A circular plate 18 is secured to the underside of bracket B and is apertured to receive the shaft or pintle 17. Adjustable means, such as studs 19 provided with lock nuts 20, may be secured to the plate 18 to limit the oscillation of the plate about the shaft or pintle 17.

By the described construction, the feeding mechanism F, the hopper H, and the control box C are free to oscillate a limited amount in a vertical plane with respect to the device D as the guiding means G rides over surface irregularities in the plate P. Suitable provision for movement of the feeding mechanism, hopper, and control box in a substantially horizontal plane with respect to the device D is provided by the hinge connection between the bracket B and the adjustable support A, and such substantially horizontal movement may be limited or restricted by means of a clamping device, all as described in Baird et al. Patent No. 2,182,575, issued December 5, 1939.

The support A comprises a sleeve member 21 formed with a hinge 22 pivoted to the bracket B, and a tubular arm 23 is secured in the sleeve member 21 by means of a pin 24. A second sleeve member 25 is telescoped on the other end of the arm 23 and is formed with a hinge clamp portion 26 by means of which the member 25 may be adjustably secured to the arm 23. The forward end of the sleeve member 25 is formed with a flange 27 for a purpose to be described hereinafter.

The support S for the hopper H comprises a vertically extending member, such as a tube or rod 30, to the lower end of which is secured by suitable means, such as welding, a clamp 31 which engages the upper surface of the sleeve member 25. A lower clamp 32 is adjustably secured to clamp 31 by suitable means, such as bolts and nuts 33, to secure the vertical member 30 in adjusted relation on the sleeve member 25. One arm 34 of a 2-way clamp 35 is adjustably mounted on the member 30 and the other arm 36 of the 2-way clamp adjustably receives a substantially horizontally extending member such as a tube or rod 37. Suitable means 38 are provided to clamp the members 30 and 37 in the 2-way clamp 35.

The hopper or storage means H comprises a hollow member 39 having a funnel-shaped bottom wall 40 merging with a valve receiving recess 41 which terminates in a tubular portion 42. The tube or rod 37 extends through diametrically aligned bosses 43 formed on the inner surface of the upper end of the hopper H and is retained therein by cotter pins 44. A butterfly valve 45, rotatably mounted in the valve recess 41, is adapted to be turned to any desired position by a wing nut 46 to control the discharge of granular welding material W from the hopper H. The welding material discharged from the hopper is conducted to the region of the welding operation immediately in advance of the fusible end of the welding rod or wire R by means of the tube T which is secured by a clamp 47 to the tubular portion 42. The distance of the lower end of tube T above the work, which distance is adjustable through the medium of the clamp 35, controls the depth of the material W on the work.

The feeding mechanism F, bus bar extension E, and guiding device G are adjustably mounted on a slide 50 adjustable longitudinally of a dovetailed guide 51 secured to the flange 27 of adjustable support A by means of bolts 52. An adjusting shim 53 is secured in the guide 51 by bolts 54 to permit assembly of the slide 50 therein. The slide 50 is adjusted along guide 51 by means of a threaded shaft 55 operated by a handwheel 56 and threadedly engaging the slide 50. The forward face of the slide 50 is formed with apertured ears 57 between which is an ear 58 formed on a motor supporting bracket 59, and the ear 58 is held in adjusted relation between the ears 57 by means of a bolt and nut 60.

The motor M of the feeding mechanism F is mounted in a split annular support 61 which is detachably secured to the bracket 59 by bolts 62 which also secure an annular handle 63 to the support 61. As the feeding mechanism F is substantially identical with that described in La Force Patent No. 2,302,781, issued November 24, 1942, detailed description is not believed necessary otherwise than to point out that the welding rod R is guided into the feeding mechanism F by a guide 64 and is fed to the work by feeding rollers mounted in a housing 65 and driven by the motor M through reduction gearing 66. Welding current is conducted to the rod R by the bus bar extension E which is secured to a bus bar 67 forming part of mechanism F. As the bus bar extension E is fully described in detail in my Patent 2,314,917, issued March 30, 1943, it is believed unnecessary to describe or illustrate the extension E in detail.

In addition to conducting welding current to the welding rod R, the extension E serves as a support for the guiding means G which comprises the guiding elements K and L engaging the plates P and P', respectively. The element K may comprise a relatively large wheel or disc 70 rotatably mounted in a bracket 71 adjustably secured to the lower end of extension E, although a suitable sliding runner may be substituted for the wheel 70. As indicated, bus bar extension E will normally lie in a plane approximately parallel to that of wheel K, and such plane may be characterized as approximately at a 45° angle. The inclined wheel K will normally be "toed in" slightly toward plate P', thereby to constantly urge the bus bar extension E inwardly towards the plate. By this disposition of parts, irregularities in plate P, having both vertical and horizontal components of direction will be smoothly translated by wheel K to extension E, and also the wheel, because of its inclination, can be worked in close to the end of extension E. The weight of the apparatus, which latter tends to pivot forwardly about hinge J, maintains the wheel 70 in firm engagement with the plate P.

The device or element L engaging plate P' is aljustably mounted on the extension E adjacent the means K, and indexing means are provided so that the plane of travel of the element L along plate P' may be adjusted angularly with respect to the plane of travel of the means or element K along plate P. The device L may comprise a smaller, edged wheel 72 engaging the plate P', and its adjustable mounting on extension E includes a split clamp 73 provided with a bearing recess 74 and an annular flange 75 formed with circumferentially equally spaced threaded apertures 76. A suitable sliding runner may be substituted for the wheel 72. A substantially circular indexing plate 77 is formed with a trunnion 78, which fits within the bearing recess 74 and with diametrically opposite apertures 79 adapted to receive bolts 80 which engage within the apertures 76 in the flange 75 for holding the plate 77 in adjusted position on the clamp 73, so that the wheel 72 may be directed against the plate P' at any desired angle with respect to wheel or disc 70.

The plate 77 is formed with a radially extending bearing sleeve 81 in which a nut 82 is held against relative longitudinal movement by a pin 83 engaging in cooperating recesses in the sleeve 81 and the nut 82. The nut 82 is internally threaded to receive a threaded shaft 84 which is held against rotatable movement with respect to sleeve 81 by a pin 85 extending through an aperture 86 in plate 77 into a longitudinally extending groove 87 in shaft 84. By rotating nut 82, shaft 84 may be adjusted longitudinally of the bearing sleeve 81.

A forked mounting bracket 88 is threaded onto the lower end of shaft 84 and locked thereon by a nut 89. The wheel 72, which engages the vertically extending plate P', is mounted between the arms of bracket 88 on a bushing 90 rotatably engaging a pin 91 extending between the arms of bracket 88.

In order that the apparatus will be effectively insulated from the welding current the feeding rollers in housing 65 are either made of insulating material or otherwise insulated from the remaining elements of feeding mechanism F. Additionally, an insulating bushing 92 may be provided around bolt 60 and insulating washers 93 may be interposed between ear 58 on bracket 59 and the ears 57 on slide 50.

Although it is preferred to mount the guiding device L as just described on the extension E, it will be apparent that, with some sacrifice in convenience and efficiency it may be mounted elsewhere along the pivoted assembly of feeding mechanism and supporting arm.

In operation, the various elements of the apparatus are relatively adjusted so that the welding rod or wire R is directed toward the intersection of the plates P, P', which are held in position by temporary tack welds, at the desired angle. By adjusting the sleeve member 25 around the arm 23, the mechanism F is turned to direct the rod R at the correct angle laterally toward plates P, P'. Nut 60 is then loosened so that the feeding mechanism F may be adjusted angularly with respect to the guide 51 to direct the welding rod or wire R at the proper angle with respect to the plane of the horizontal member to be welded. By operation of wheel 56, the mechanism F is raised or lowered to position the end of extension E at the proper distance from the work. At the same time, through the medium of the clamps 31 and 32 and the 2-way clamp 35, the hopper H may be so adjusted that the tube T will discharge the welding material W along the intersection of plates P, P' slightly in advance of the welding rod or wire R, and the lower end of the tube will be spaced from the work an amount equal to the desired depth of the welding material W.

When the foregoing adjustments have been made, bracket 71 is adjusted along extension E to bring wheel 70 into contact with plate P. The bolts 80 are loosened and removed from the indexing plate 77, and the plate is then rotated into a position such that wheel 72 will be directed at the proper angle against the palte P', after which the bolts 80 are threaded into the apertures 76. By operation of the nut 82, the shaft 84 is so moved that the edge of wheel 72 will engage the plate P'.

The bracket 71 for the wheel 70 is so adjusted on the extension E that the wheel 70 will be "toed in" toward the plate P'. Therefore, as the welding apparatus advances along the seam to be welded, the wheel 72 will be maintained in firm contact with the plate P'. The weight of the apparatus, tending to pivot the feeding mechanism and the hopper forwardly about the hinge connection J, maintains the wheel 70 fixed in engagement with the plate P.

It will be noted that, due to the provisions of the several adjustments in the supporting device A, the bracket B, the guide 51 and slide 50, the 2-way clamp 35, the clamps 31 and 32, the bolt 60, and those provided in the guiding device G, the described welding apparatus is adjustable for use in any operation in which it is desired to form a fillet weld between two plates to be welded. Additionally, the hopper H is so adjustably mounted with relation to the remainder of the apparatus that the tube T can be readily positioned to discharge the welding material W in and around the fusible end of the welding rod or wire R, and to control the depth of the discharged welding material on the work. The wire R either may be fed from a reel or may be provided in short straight sections and fed into the feeding device F.

It will sometimes be desired to make fillet welds simultaneously on opposite sides of a joint. By slightly modifying the apparatus shown in Fig. 1 this operation may readily be accomplished. Appropriate modifications for this purpose are illustrated in Figs. 7 and 8. As shown in these figures, the motive device D may be provided with a wheeled long-legged frame W which straddles the vertical plate P' and supports the body of the device D and control box C astride the plate. Motive power is supplied by the device D to the rear wheels of the frame W, as by a pair of chains 101 and 102 and sprockets 103 and 104. Thus, the frame W becomes part of the motive device. The travel of the frame W along the plate intersection to be welded is guided by runners or wheels 105 and 106 supported near the rear of the frame W by arms 107 and 108 adjustably secured to the frame by clamps 109 and 110. A similar pair of guiding devices is preferably mounted near the front of the frame as indicated by the bracket 112 shown in Fig. 7.

On each side of the frame W is mounted a bracket B and rocker hinge J, with a support A carrying a rod feeding mechanism F and a hopper H. Each of these devices functions simultaneously, one on each side of the vertical plate P', to make a fillet weld as described in detail hereinbefore.

It will sometimes be more convenient to mount the hopper supports S on the frame W or the motive device D instead of on the support A.

When the tack welds along the seam between the plates P, P' do not project far above the seam, the guiding elements K and L may be adjusted to run close to the corner of the seam. In such a case it will be more convenient to mount the elements K and L more closely together than is illustrated in Figs. 1 to 6. A simple means for accomplishing this result is illustrated in Fig. 9 and comprises a single wheel KL provided with a flange 115 which bears on the vertical plate P' and serves the function of guiding element L, and a second flange 116 which bears on the horizontal plate P and serves the function of the guiding element K. The wheel KL may be mounted as illustrated for wheel 72 in Figs. 1 to 6, and the wheel K of those figures omitted.

While particular embodiments of the invention have been shown and described, it should be understood that the invention is not necessarily limited thereto and may be otherwise embodied without departing from the principles of the invention.

I claim:

1. Electric fillet welding apparatus comprising, in combination, a motive device for moving said apparatus along the intersection of angularly disposed metal members, including a horizontal member, to be united by a fillet weld; a supporting arm, at one end mounted on said device through a vertical pivot providing for movement of the arm in a horizontal plane and a mount providing for oscillation through a limited distance in a vertical plane; a welding rod feeding mechanism adjustably mounted on the other end of said supporting arm, and means operatively associated with said feeding mechanism for conducting electric welding current to a welding rod fed by such mechanism; and means for guiding said feeding mechanism and welding rod along said intersection to effect a fillet weld, said guiding means comprising a first guide adjustably mounted adjacent the end of said welding rod and adapted to engage at an angle said horizontal member to urge said rod end towards said intersection, and a second guide adapted and arranged to engage the other of said members to restrain the movement of said rod end towards said intersection.

2. Electric fillet welding apparatus comprising, in combination, a motive device for moving said apparatus along the intersection of angularly disposed members to be united by a fillet weld; an adjustable support pivotally mounted at one end on said device for oscillation in a vertical plane; means providing adjustment of said support in a horizontal plane; a welding rod feeding mechanism adjustably mounted on one end of said support; means operatively associated with said feeding mechanism for conducting electric welding current to a welding rod; guiding means adjustably mounted on said current conducting means and adapted to engage a horizontally disposed one of said members, said means being so adjusted as to urge said current conducting means toward a substantially vertically disposed one of said members to be welded; guiding means adjustably mounted on said current conducting means and adapted to engage said substantially vertically disposed member to be welded; and means for adjusting the angular relation of said last-named means to the members to be welded.

3. Welding apparatus as claimed in claim 2, in which said adjustable support includes a sleeve member pivotally mounted on said device for movement in a horizontal plane; an arm member fixedly secured in said sleeve member; a second sleeve member mounted on the other end of said arm member for longitudinal and rotational adjustment with respect to said sleeve; and a guide mounted on the outer end of said second sleeve member to adjustably support the feeding mechanism and provide for vertical adjustment thereof.

4. Welding apparatus as claimed in claim 2, including a control box pivotally mounted on said motive device for oscillation in a vertical plane and as a unit with said adjustable support.

5. Electric fillet welding apparatus comprising, in combination, a motive device for moving said apparatus along the intersection of angularly disposed members to be united by a fillet weld; a welding rod feeding mechanism adjustably mounted on said device; an elongated bus bar extension secured to said welding rod feeding mechanism and adapted to conduct electric welding current to a welding rod; means for directing a welding rod passing through said mechanism toward the intersection of said angularly disposed members; a first bracket adjustably secured to said extension; guiding means mounted in said first bracket and adapted to engage one of said members to be welded; a second bracket adjustably secured to said extension; an indexing plate angularly adjustable relative to said second bracket; a guiding element adjustably mounted on said indexing plate and adapted to engage the other of said members to be welded; and means for adjusting said guiding element relative to said indexing plate.

6. Electric fillet welding apparatus comprising, in combination, a motive device for moving said apparatus along the intersection of angularly disposed members to be united by a fillet weld; a welding rod feeding mechanism adjustably mounted on said motive device; a bus bar extension operatively associated with said mechanism and adapted to conduct electric welding current to a welding rod fed by said mechanism toward said intersection; means, comprising a pair of guiding elements, adapted to maintain constant the position of said welding rod with respect to the intersection of said members; each of said guiding elements being adapted to engage one of said members to be welded; and means for adjusting the relative angular relation of said guiding elements.

7. Welding apparatus as claimed in claim 6, in which said guiding means includes a first bracket adjustably mounted on said extension; a member rotatably mounted in said first bracket and adapted to engage one of said members to be welded; a second bracket adjustably mounted on said extension; an indexing plate mounted on and angularly adjustable with respect to said second bracket; a rotatable nut mounted in said indexing plate; a threaded shaft engaged by said nut; means for restraining rotation of said shaft relative to said indexing plate; a bifurcated bracket adjustably mounted on said threaded shaft; and a member rotatably mounted in said bifurcated bracket and adapted to engage the other member to be welded.

8. Welding apparatus as claimed in claim 6, including a longitudinally adjustable support pivotally mounted on said motive device for oscillation in a vertical plane; means providing adjustment of said support in a horizontal plane; a guide mounted on one end of said support; a slide adjustably mounted in said guide; a threaded shaft engaging said slide and fixed against longitudinal movement with respect to said guide; means for rotating said shaft to adjust said slide longitudinally of said guide; and means secured to said slide and providing for adjustment of said feeding mechanism angularly in the plane of said support.

9. Welding apparatus comprising, in combination, an elongated bus bar extension adapted to be secured to the bus bar of a welding rod feeding mechanism; and means for guiding said extension along the intersection of a pair of members to be fillet welded, said means comprising a pair of guiding elements adjustably mounted on one end of said extension and each adapted to engage one of the members to be welded, and means for adjusting the angular relation of said guiding elements.

10. Electric welding apparatus guiding means comprising, in combination, a split clamp provided with a bearing recess and an annular flange formed with circumferentially equally spaced threaded apertures; a substantially circular indexing plate formed with a trunnion fitting within said bearing recess and with diametrically opposite apertures; bolts extending through the apertures in said plate into the apertures in said clamp; a radially extending bearing sleeve formed on said plate; a nut rotatably mounted in said bearing sleeve; means restraining longitudinal movement of said nut in said sleeve; a threaded shaft operatively associated with said nut; means restraining rotation of said shaft relative to said sleeve; a bracket secured to said shaft; and a guiding element mounted on said bracket.

11. Electric fillet welding apparatus comprising, in combination, an elongated bus bar extension adapted to be secured to the bus bar of a welding rod feeding mechanism; a first bracket adjustable longitudinally of said extension; a wheel rotatably mounted in said first bracket; a second bracket adjustable longitudinally of said extension; an indexing plate rotatably mounted on said second bracket; and a second wheel adjustably mounted on said indexing plate.

12. Welding apparatus comprising, in combination, an elongated bus bar extension for association with the bus bar of a welding rod feeding mechanism; and means for guiding said extension along the intersection of a pair of angularly disposed members to be fillet welded, such means including at least one guide wheel inclined from the vertical and approximately parallel to said bus bar extension and adjacent the end thereof, and adapted to contact one of said members.

13. Welding apparatus as defined in claim 12 wherein said wheel is toed in towards one of said members.

14. Welding apparatus comprising, in combination, an elongated bus bar extension for association with the bus bar of a welding rod feeding mechanism; and means for guiding said extension along the intersection of a perpendicular member and a horizontal member to be fillet welded, such means including a guide wheel inclined 45° from the vertical for supporting said bus bar extension and adapted to engage the horizontal member to be welded, and means for adjusting the position of the inclined wheel relative to said bus bar extension.

15. Welding apparatus comprising, in combination, an elongated bus bar extension for association with the bus bar of a welding rod feeding mechanism; and means for guiding said extension along the intersection of a pair of angularly disposed members to be fillet welded, one of said members being perpendicularly disposed and the other being horizontally disposed, such means including a guide wheel inclined from the vertical for supporting said bus bar extension and adapted to engage the horizontal member to be welded, said guide wheel being toed in towards the perpendicularly disposed member.

16. Welding apparatus as defined in claim 15 wherein said bus bar extension is positioned at a 45° angle.

17. Welding apparatus as claimed in claim 2, including a welding material hopper adjustably mounted on said support; means connected to said hopper and adapted to conduct welding material therefrom to the intersection of the members to be welded; and means for controlling the discharge of welding material from said hopper.

18. Welding apparatus as claimed in claim 2, in which said adjustable support is provided at its outer end with a vertically disposed guide; a slide adjustable longitudinally of said guide; and means adjustably connecting said slide to said feeding mechanism.

19. Welding apparatus as claimed in claim 2, including an elongated rod; means adjustably clamping one end of said rod to said adjustable support; a 2-way clamp adjustably mounted on the other end of said elongated rod; a second elongated rod adjustably secured in said 2-way clamp and extending at substantially right angles to said first elongated rod; a welding material hopper removably mounted on the end of said elongated rod; and means for conducting welding material from said hopper to the intersection of said members to be united by a fillet weld.

20. Welding apparatus comprising, in combination, an elongated bus bar extension for association with the bus bar of a welding rod feeding mechanism; and means for guiding said extension along the intersection of a pair of angularly disposed members to be fillet welded, such means comprising a pair of guiding elements associated with said extension and each adapted to engage one of the members to be welded, and means for adjusting the relative position of said guiding elements.

ALBERT W. BAIRD.